United States Patent [19]

Nishihara et al.

[11] Patent Number: 5,506,916
[45] Date of Patent: Apr. 9, 1996

[54] IMAGE COMPRESSION APPARATUS USING A LOSSY COMPRESSION METHOD

[75] Inventors: Eitaro Nishihara, Ootawara; Zhixiong Wu; Yoshihiko Ogawa, both of Sapporo, all of Japan

[73] Assignee: Kabushiki Kaisha Toshiba, Kawasaki, Japan

[21] Appl. No.: 982,117

[22] Filed: Nov. 25, 1992

Related U.S. Application Data

[63] Continuation of Ser. No. 835,078, Feb. 18, 1992, abandoned, which is a continuation of Ser. No. 629,008, Dec. 18, 1990, abandoned, which is a continuation of Ser. No. 108,789, Oct. 15, 1987, abandoned.

[30] Foreign Application Priority Data

Oct. 18, 1986 [JP] Japan ................. 61-247997
Oct. 28, 1986 [JP] Japan ................. 61-254739
Nov. 14, 1986 [JP] Japan ................. 61-272365

[51] Int. Cl.⁶ .......................................... G06K 9/36
[52] U.S. Cl. ........................................... 382/232
[58] Field of Search ................... 382/17, 41, 43, 382/56; 358/135, 136, 427, 432, 433, 435; G06K 9/46, 9/66, 9/36; H04N 7/12

[56] References Cited

U.S. PATENT DOCUMENTS

| | | | |
|---|---|---|---|
| 4,442,454 | 4/1984 | Powell | 358/167 |
| 4,633,296 | 12/1986 | Cham et al. | 358/133 |
| 4,698,689 | 10/1987 | Tzou | 358/433 |
| 4,704,628 | 11/1987 | Chen et al. | 358/136 |
| 4,734,767 | 3/1989 | Kaneko et al. | 358/135 |
| 4,805,030 | 2/1989 | Tanaka | 358/433 |
| 4,807,042 | 2/1989 | Tanaka | 358/433 |
| 4,945,502 | 7/1990 | Kwon et al. | 358/167 |
| 4,947,447 | 8/1990 | Miyaoka et al. | 358/433 |

OTHER PUBLICATIONS

German Patent Office Action and translation dated Aug. 21, 1989.
W. Pratt, J. Kane, H. Andrews, "Hadamard Transform Image Coding", Proceedings of the IEEE, vol. 57, No. 1, Jan. 1967, pp. 58–70.
W. Chen, C. H. Smith, "Adaptive Coding of Monochrome and Color Images" IEEE Transactions on Communications, vol. COM–25, No. 11, Nov. 1977, pp. 1285–1292.
A. Habibi, "Survey of Adaptive Image Coding Techniques", IEEE Transactions on Communication, vol. COM–25, No. 11, Nov. 1977, pp. 1275–1284.
P. Wintz, "Transfer Picture Coding", Proceedings of the IEEE, vol. 60, No. 7, Jul. 1972, pp. 809–819.

*Primary Examiner*—Jose L. Couso
*Attorney, Agent, or Firm*—Finnegan, Henderson, Farabow, Garrett & Dunner

[57] ABSTRACT

An image compression apparatus has a separation section for performing processing for dividing image data into a plurality of data blocks, an orthogonal transformer for orthogonal-transforming each data block, a bit allocation table for storing data representing the number of bits allocated in accordance with the frequency component of the orthogonal-transformed data output from the orthogonal transformer, an arithmetic operation circuit for calculating an amplitude probability density function of an identical frequency component of the orthogonal-transformed image data for each pixel, and calculating a quantization limit band causing a mean square error to be minimized in acordance with the calculating amplitude probability density function and the bit-number data from the bit allocation table, and a band limit table for storing the quantization limit band data. A quantizing circuit quantizes the orthogonal-transformed block information from the orthogonal transformer in accordance with the data stored in the allocation table and the band limit table.

13 Claims, 10 Drawing Sheets

F I G. 1

F I G. 2

| BIT | Δ(σ)/σ | Err (σ = 1) |
|---|---|---|
| 1 | 3.19999981 | 0.363384247 |
| 2 | 4.00000000 | 0.118851900 |
| 3 | 4.70000076 | 0.374401808E — 01 |
| 4 | 5.40000057 | 0.115460157E — 01 |
| 5 | 6.00000095 | 0.349400938E — 02 |
| 6 | 6.70000076 | 0.103883445E — 02 |
| 7 | 7.30000114 | 0.303413719E — 03 |
| 8 | 7.90000153 | 0.861757435E — 04 |
| 9 | 8.60000134 | 0.235528860E — 04 |
| 10 | 9.20000172 | 0.486004865E— 05 |

IMAGE COMPRESSION APPARATUS USING A LOSSY COMPRESSION METHOD

This application is a continuation of application Ser. No. 07/835,078, filed Feb. 18, 1992, now abandoned, which is a continuation of application Ser. No. 07/629,008, filed Dec. 18, 1990, abandoned, which is a continuation of application Ser. No. 07/108,789, filed Oct. 15, 1987, abandoned.

BACKGROUND OF THE INVENTION

The present invention relates to an image compression apparatus and, more particularly, to an image compression apparatus using a lossy compression method.

When a multi-contrast image constituted by a plurality of gray scale levels is to be compressed, a lossless compression method or a lossy compression method is normally used. As the lossless compression method, compression methods such as a run length coding method, a Huffman coding method, and the like, which can perfectly reproduce an original image are known. As the lossy compression method, a KLT method or a cosine transform method is known. The lossy compression method cam realize a higher compression ratio (a compression ratio of the lossless compression method: 1/2 to 1/3, a compression ratio of the lossy compression method: max. 1/10) than that of the lossless compression method. However, an original image cannot be perfectly reproduced, and the quality of the reproduced image is degraded in proportion to the compression ratio.

Of the lossy compression methods, a discrete cosine transform method receives a lot of attention since an image quality is not so degraded and a high-speed operation can be achieved. However, not only the discrete cosine transform method, but the discrete orthogonal transform method has the following disadvantages. For example, a so-called "block effect" phenomenon occurs, i.e., a block structure appears in a reproduced image due to an error caused when an image is divided into a plurality of blocks and when a low-frequency component is quantized. In addition, a "dim edge" phenomenon occurs, i.e., a clear edge cannot be obtained since a high-frequency component is cut off.

SUMMARY OF THE INVENTION

It is an object of the present invention to provide image compression apparatus which can suppress block effect and dim edge phenomena, and can improve the quality of a reproduced image.

According to the present invention, the image compression apparatus comprises a separation section for performing processing for dividing image data into a plurality of blocks; an orthogonal transformer for orthogonal-transforming each block data; a bit allocation table for storing data indicating the number of bits assigned in accordance with a frequency component of orthogonal-transformed data output from the orthogonal transformer; an arithmetic operation circuit for calculating an amplitude probability density function of an identical frequency component of the orthogonal-transformed image data for each image, and calculating a quantization limit band in which a mean square error is minimized in accordance with the calculated amplitude probability density function and the bit number data from the bit allocation table; and a band limit table for storing the quantization limit band data. A quantization circuit quantizes the orthogonal-transformed block information from the orthogonal transformer in accordance with the data stored in the allocation table and the band limit table.

According to the present invention, a preprocessor is arranged at the input side of an image compression processing circuit. The preprocessor extracts pixels at an identical spatial coordinate position from each of image blocks obtained from a separation section, and calculates a mean value of these pixels. The preprocessor subtracts the mean value from the pixels corresponding to the mean value.

Furthermore, according to the present invention, a first orthogonal transformer for orthogonal-transforming image blocks, a reconstruction circuit for reconstructing a plurality of orthogonal-transformed image blocks having different frequency components to a plurality of blocks each having an identical frequency component, and a second orthogonal transformer for orthogonal-transforming a predetermined block of the reconstructed blocks are provided.

DETAILED DESCRIPTION OF THE PREFERRED EMBODIMENTS

Figure 1:
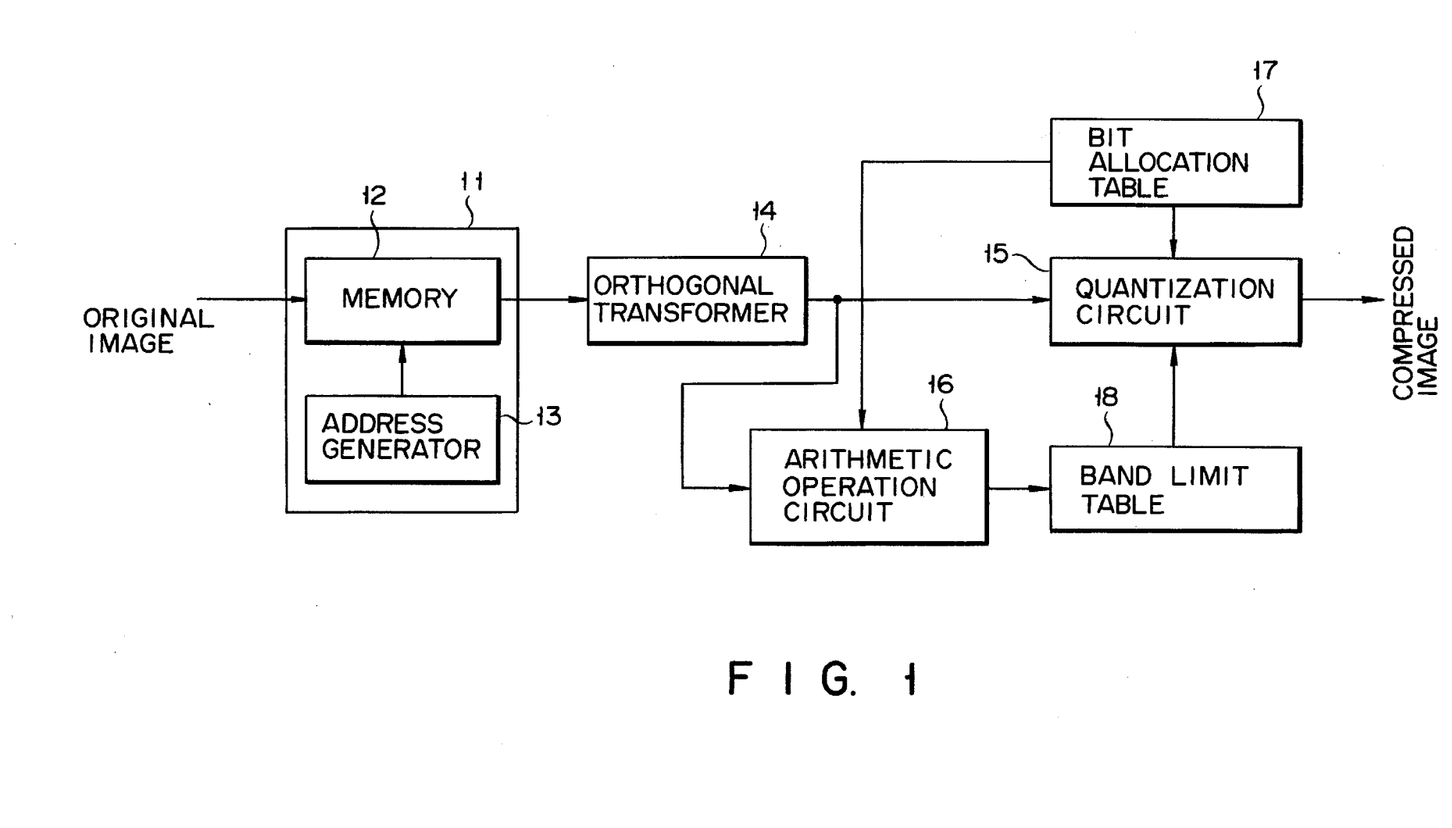
FIG. 1 is a block diagram of an image compression apparatus according to an embodiment of the present invention.

According to an embodiment shown in FIG. 1, separation circuit 11 is arranged to divide original image data output from an image output apparatus (e.g., TV camera, VTR, and the like) into a plurality of image blocks. Separation circuit 11 comprises memory 12 for storing image data, and address generator 13 for outputting address data for reading out image data of each block from memory 12. The readout terminal of memory 12 is connected to the input terminal of orthogonal transformer 14. Orthogonal transformer 14 comprises an orthogonal transformer for performing orthogonal transform, e.g., two-dimensional fast cosine transform of the image data from separation circuit 11. The output terminal of transformer 14 is connected to the input terminal of quantization circuit 15 and the input terminal of arithmetic operation circuit 16. The control data input terminals of quantization circuit 15 are connected to bit allocation table 17 and band limit table 18.

When orthogonal-transformed image data is quantized by quantization circuit 15, distortion D due to quantization is represented by the following equation:

$$D = 1/N^2 \cdot \sum_{m=0}^{N-1} \sum_{n=0}^{N-1} E\{|f(m,n) - fq(m,n)|^2\} \quad (1)$$

$$= 1/N^2 \cdot \sum_{u=0}^{N-1} \sum_{v=0}^{N-1} E\{|F(m,n) - Fq(m,n)|^2\}$$

$$E = \{|F(u,v) - Fq(u,v)|^2\} = 2^{-2b(u,v)} d(u,v) b(u,v) \quad (2)$$

where du.v(du,v) represents a mean square error when bu.v bits are used for F(u,v), m, n are 1, 2, ..., N−1, and F(u,v) represents a cosine-transformed value. From the formula of Wintz and Kurtenback,
when $$d(u,v)b(u,v) = \exp(-1/2b(u,v)\eta 10) \quad (3)$$

distortion D is minimized. Therefore, from equations (1), (2), and (3), optimal bit allocation can be obtained by the following equation:

$$b_{u,v} = b_{aver} + 2/\ln 10 [\ln \sigma^2(u,v) - 1/N^2 \Sigma\Sigma \ln \sigma^2(u,v)] \quad (4)$$

$$b_{aver} = 1/N^2 \cdot \sum_{u=0}^{N-1} \sum_{v=0}^{N-1} b(u,v) \quad (5)$$

where $\sigma^2(u,v)$ is a variance of F(u,v). If a mean pixel is given, b(u,v) of all the pixels can be per calculated.

When bit allocation is determined, an optimal quantization band is determined. As described above, in order to minimize the distortion, equation (2) must be minimized. Since all F(u,v) have similar distributions, if a normalized probability density function is given as p(y) and E{F}=0, the following equation (6) can be established for given bit b:

$$\begin{aligned} Err &= E\{|F-Fq|^2\} \quad (6) \\ &= \sigma^2 \int_{-\infty}^{\frac{L}{2}-1} [y + (-L-1) \cdot \Delta L/2]^2 dy + \\ &\quad \sigma^2 \sum_{l=-\frac{L}{2}-l+1}^{\frac{L}{2}-1} \int_{(l-1)\Delta L}^{l\Delta L} [y - (l - 1/2)\Delta L]^2 dy + \\ &\quad \sigma^2 \int_{(\frac{L}{2}-1)\Delta L}^{\infty} [y - (L-1)\Delta L/2]^2 dy \end{aligned}$$

F ... quantization band
Fq ... quantization amplitude
$L=2^b$ ... number of quantization steps
$\Delta L = \Delta(\sigma)/L$ ... quantization step width
$\Delta(\sigma) = \Delta$ ... quantization band width If $\Delta(\sigma)$ is selected to minimize Err, optimal quantization can be realized. Since F is normally a zero mean and exhibits a Gauss distribution, p(y) can be expressed as follows:

$$p(y) = 1/\sqrt{2\pi} \cdot \exp\{-1/2y^2\} \quad (7)$$

Figure 2:
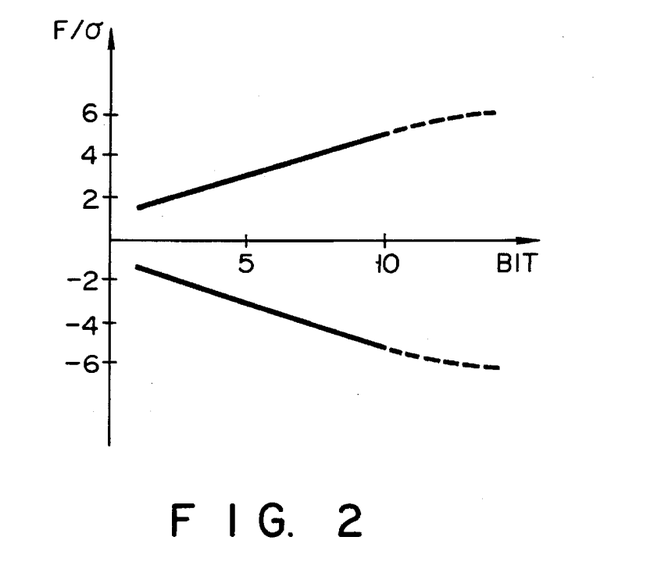
FIG. 2 is a graph showing an optimal quantization band.
Figure 3:
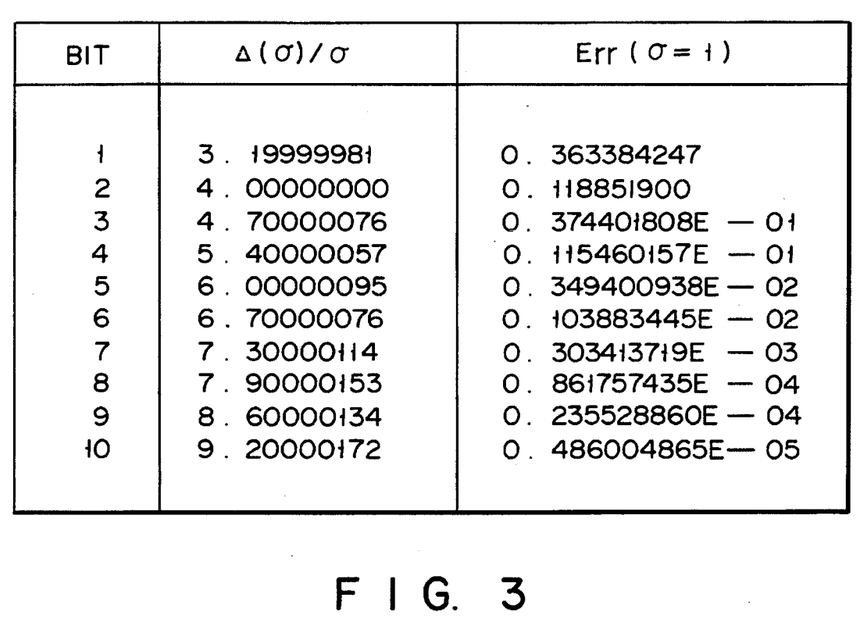
FIG. 3 is a table showing an optimal quantization band.

Based on calculated p(y), a quantization limit band minimizing a mean square quantization error with respect to the number of bits given by bit allocation table 17 is calculated. FIGS. 2 and 3 show the quantization limit band calculated as described above. The values shown in FIG. 3 is stored in band limit table 18.

Orthogonal-transformed image data is quantized by quantization circuit 15 using band limit table 18 and bit allocation table 17. Image compression will be described with reference to FIG. 1.

Figure 4:
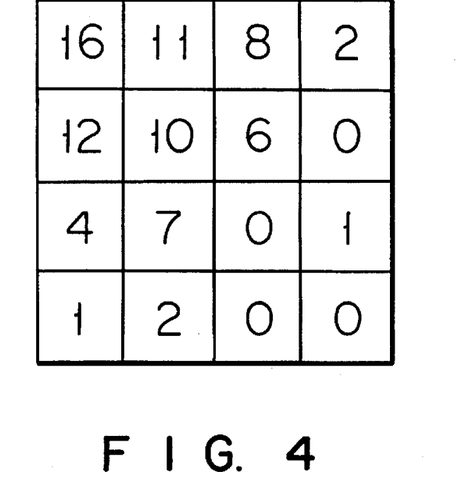
FIG. 4 is a view showing a bit configuration of a block subjected to orthogonal transform.
Figure 5:
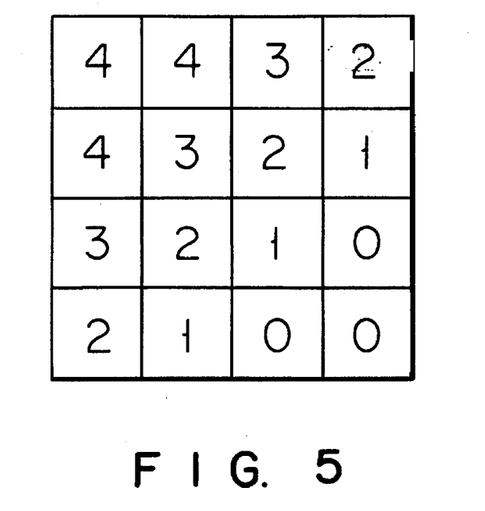
FIG. 5 is a view showing a bit allocation table.
Figure 6:
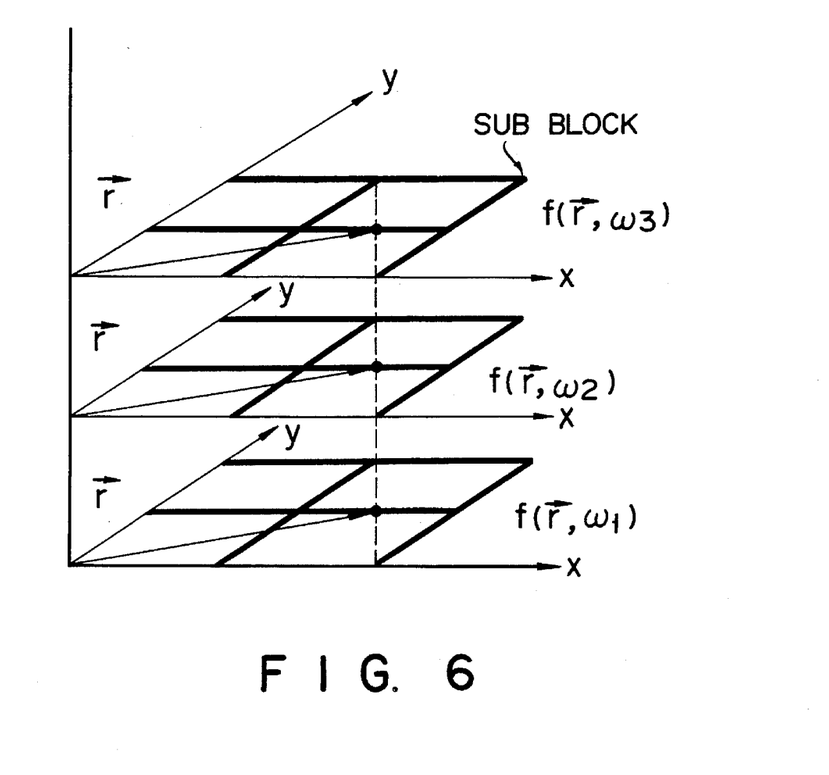
FIG. 6 is a view for explaining a method for calculating a pseudo-ensemble mean and pseudo-ensemble zero mean.

Image data from an image signal source is stored in memory 12. Address generator 13 generates address data for dividing image data into a plurality of blocks as shown in FIG. 4 and reading out the image data from memory 12. Each time a block of image data is read out, each block of image data is input to orthogonal transformer 14, and is subjected to, e.g., two-dimensional cosine transform. The orthogonal-transformed data shown in, e.g., FIG. 4 is obtained in units of blocks by orthogonal transform. A bit allocation table shown in FIG. 5 is formed with respect to the orthogonal-transformed data.

The orthogonal-transformed data are input to arithmetic operation circuit 16 so as to calculate an amplitude probability density function with respect to an identical frequency component. When the amplitude probability density function is calculated, a quantization limit band for minimizing a mean square error with respect to the number of bits given from bit allocation table 17 is calculated based on the above-mentioned equation. The quantization limit band is stored in band limit table 18.

Since the orthogonal-transformed image data is quantized in accordance with the quantization limit band which changes in correspondence with a change in allocation number of bits, a distortion due to quantization can be eliminated. For this reason, when compressed image data is reproduced, the reproduced image can have substantially the same image quality as that of an original image.

In the above embodiment, since the frequency component of the orthogonal-transformed image data has a similar amplitude probability density function, the amplitude probability density function is calculated beforehand, and a quantization limit band is calculated to minimize a mean square error for each bit. If the quantization limit band is stored in band limit table 18, the limit band need not be independently calculated for each image, and arithmetic operation circuit 16 can be omitted.

A quantization error can be eliminated by changing the limit band in accordance with the allocation number of bits, as described above. Quantization errors increase when an amplitude distribution of an identical frequency component after orthogonal transform falls outside the center set at the quantization circuit, and components falling outside the quantization band increase. Paying attention to this fact, the present inventors developed a preprocessor which is arranged at the input side of an image compression apparatus to correct decentering. In preprocessing by the preprocessor, an original image is divided into a plurality of blocks (subblocks), and a mean (pseudo-ensemble mean) of frequency components of pixels at an identical spatial coordinate position of each block is calculated. The mean is subtracted from a value of the frequency component of the corresponding pixel in each block. The difference is called a pseudo-ensemble zero mean.

If a pixel value at spatial coordinate position r in an ith (i is a positive integer) subblock is given as $f(\vec{r}, \omega i)$, ensemble-mean Mean is expressed by equation (8):

$$\text{Mean}(\vec{r}) = 1/N \cdot \sum_{i=0}^{N-1} f(\vec{r}, \omega i) \quad (8)$$

where N represents the total number of blocks. Pseudo-ensemble zero mean $f'(\vec{r}, \omega i)$ can be expressed by equation (9):

$$f'(\vec{r},\omega i)=f(\vec{r}, \omega i)-\text{Mean}(\vec{r}) \qquad (9)$$

The following equation (10) can be established between pseudo-ensemble zero means calculated based on equation (9):

$$\sum_{i=0}^{N-1} f'(\vec{r},\omega i) = 0 \qquad (10)$$

Image data corresponding to the pseudo-ensemble zero means calculated based on equation (9) are input to an image compression apparatus, and are subjected to image compression.

Figure 7:
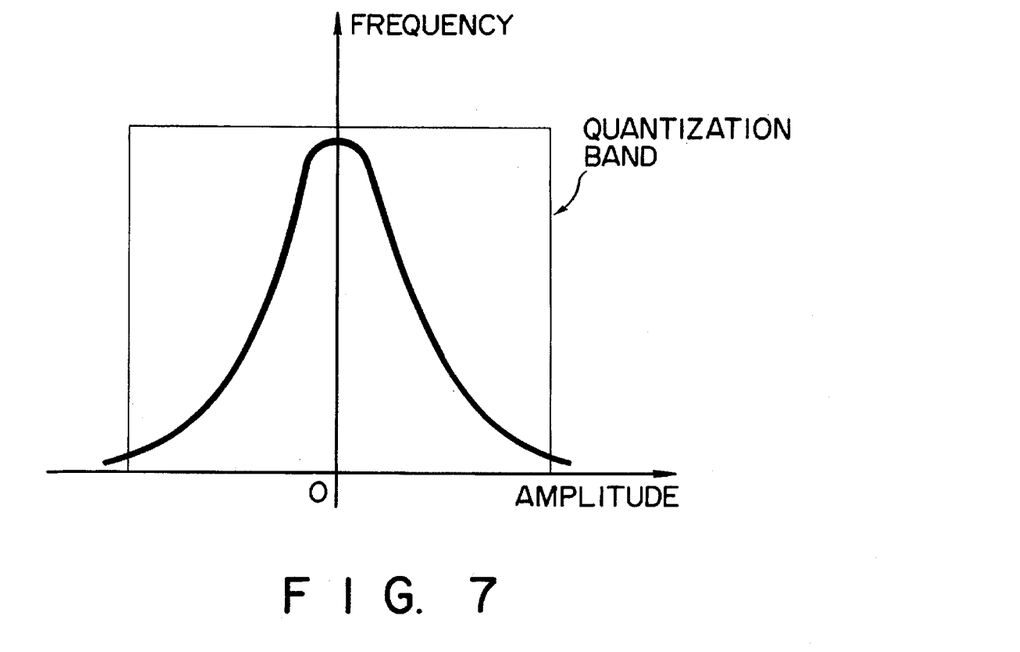
FIG. 7 is a view showing a distribution of a quantization band subjected to zero-shift correction.

By preprocessing original image data, image data, that the amplitude of the distribution of identical frequency components derived from the blocks does not fall outside the quantization center, as shown in FIG. 7, can be obtained. The image data is input to image compression apparatus and is subjected to compression processing. Thus, a quantization error can be suppressed, and an S/N ratio can be improved.

Figure 8:
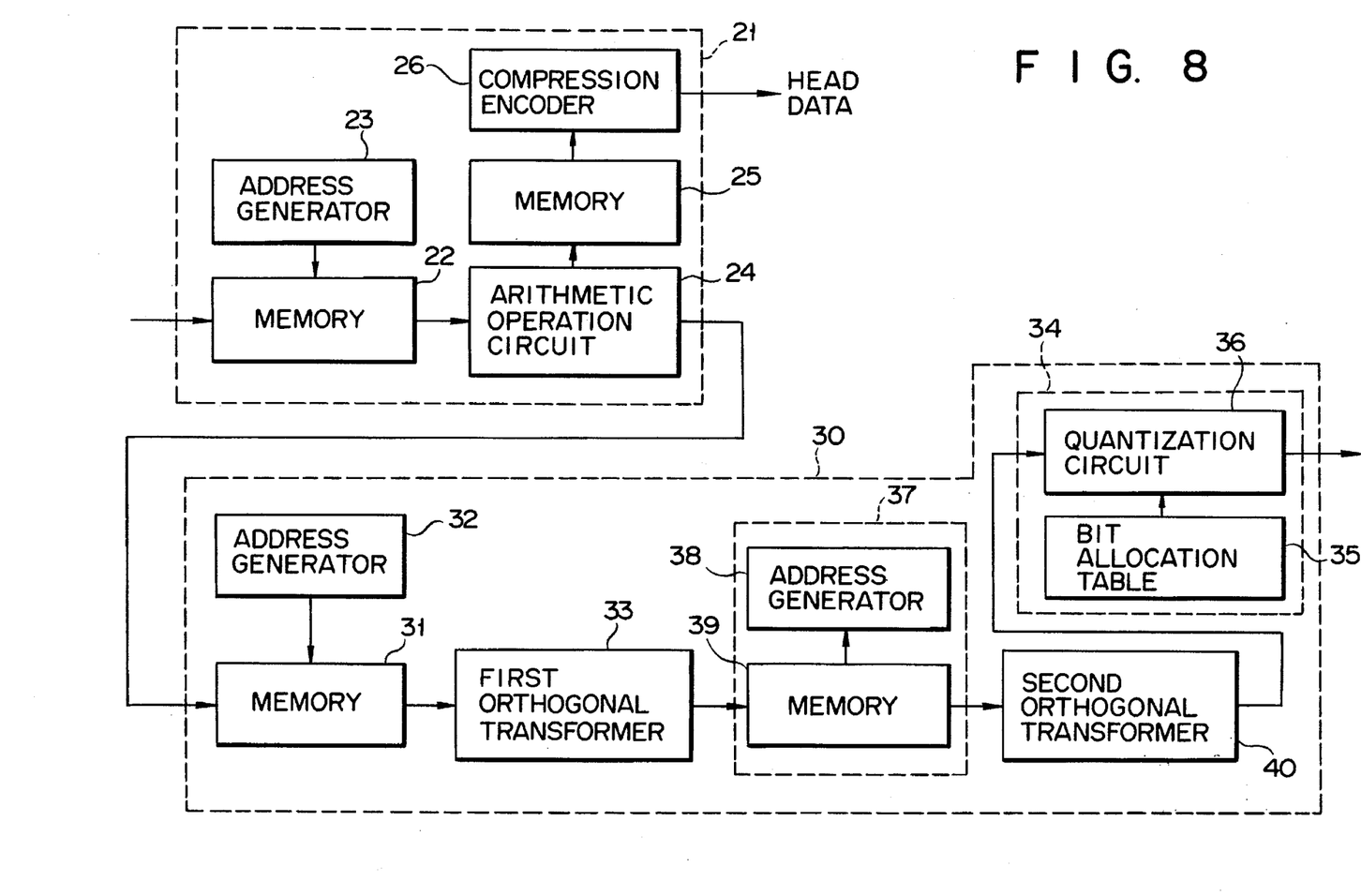
FIG. 8 is a block diagram of an image compression apparatus according to another embodiment of the present invention.

An embodiment adopting preprocessing based on the above-mentioned principle will be described with reference to FIG. 8.

Preprocessor 21 has memory 22 for storing an original image, address generator 23 for inputting address data to memory 22, arithmetic operation circuit 24 connected to the readout terminal of memory 22, memory 25 for storing an output from the arithmetic operation circuit, and compression encoder 26 for compressing and encoding data read out from memory 25.

Memory 22 and address generator 23 have a function of a separation circuit for dividing original image data into a plurality of blocks. Arithmetic operation circuit 24 calculates a pseudo-ensemble mean and a pseudo-ensemble zero mean based on equations (8) and (9). Memory 25 stores the pseudo-ensemble mean and the pseudo-ensemble zero mean calculated by circuit 24. Compression encoder 26 compresses and encodes the ensemble mean values stored in memory 25, and outputs the encoded data as head data. The head data is used for reproducing compressed image data.

The output terminal of arithmetic operation circuit 24 of preprocessor 21 is connected to the write terminal of memory 31 in image compression apparatus 30. The address input terminal of memory 31 is connected to address generator 32. The readout terminal of memory is connected to the input terminal of first orthogonal transformer 33. The output terminal of first orthogonal transformer 33 is connected to the write terminal of memory 39 in reconstruction circuit 37. The address terminal of memory 39 is connected to the output terminal of address generator 38.

The readout terminal of memory 39 of reconstruction circuit 37 is connected to the input terminal of second orthogonal transformer 40. The output terminal of second orthogonal transformer 40 is connected to the input terminal of quantization circuit 36. Quantization circuit 16 receives bit-number data from bit allocation table 15, and quantizes the output from transformer 40.

Figure 9:
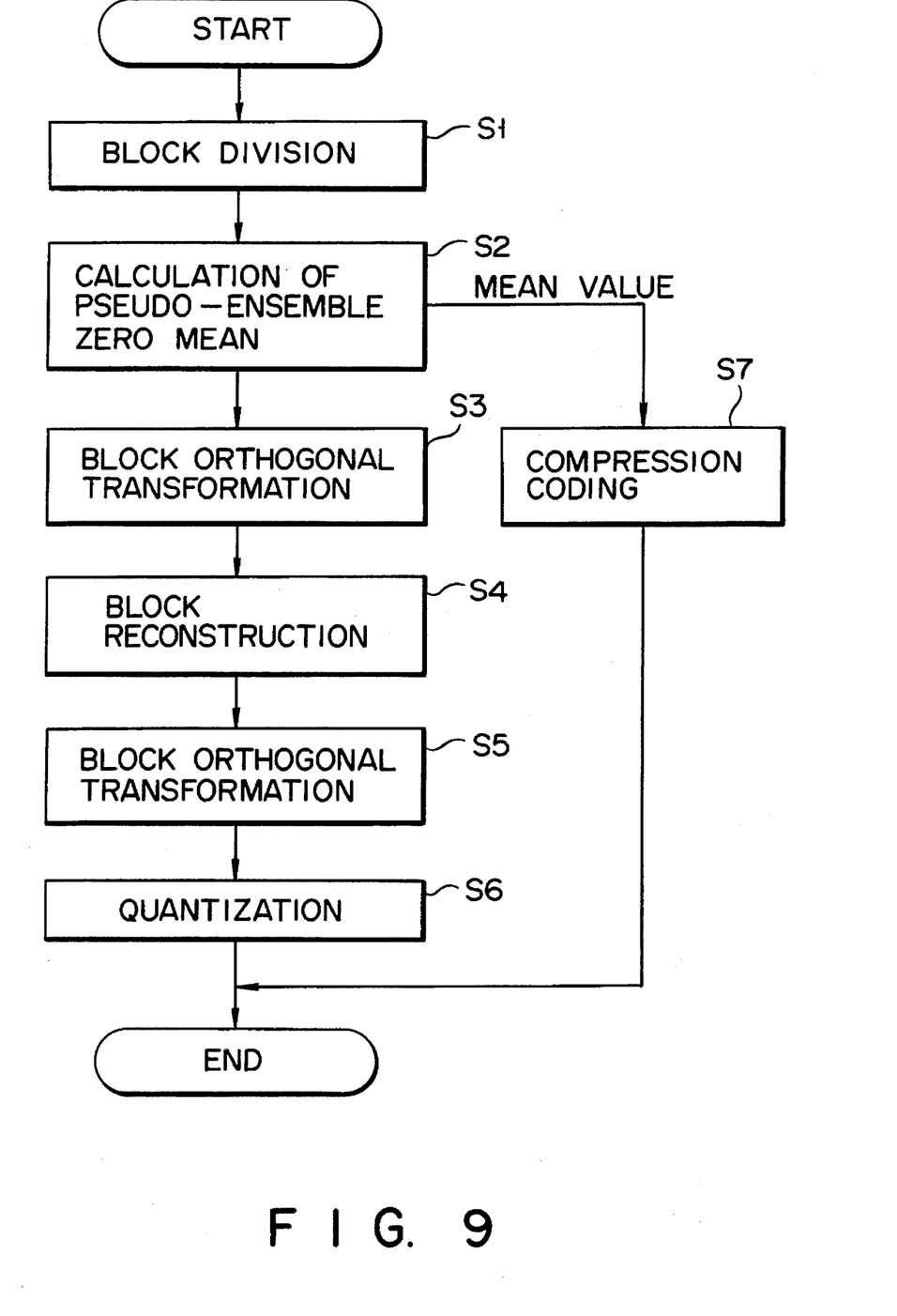
FIG. 9 is a flow chart for explaining the operation of the circuit shown in FIG. 8.

The image compression operation by the circuit shown in FIG. 8 will be described with reference to the flow chart shown in FIG. 9.

When original image data is written in memory 22, memory 22 is accessed by address data supplied from address generator 32, and divides original image data into a plurality of blocks and supplies them to arithmetic operation circuit 24 (step S1). Arithmetic operation circuit 24 calculates a pseudo-ensemble mean and a pseudo-ensemble zero mean from the values of pixels of the plurality of blocks at an identical spatial coordinate position based on equations (8) and (9) (step S2). The pseudo-ensemble mean is input to compression encoder 26 through memory 25, and is encoded thereby. The encoded data is then output as head data (step S7).

Figure 10A:
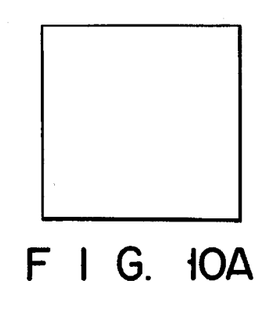
FIGS. 10A to 10F are views representing image data.
Figure 10B:
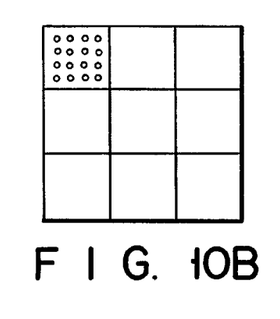

The pseudo-ensemble zero mean (differential output) is written in memory 31 of image compression apparatus 30 as a preprocessed output. The preprocessed image data (FIG. 10A) stored in memory 31 is read out from memory 31 as a plurality of blocks (FIG. 10B) in accordance with address data input from address generator 32, and is input to first orthogonal transformer 33.

Figure 10C:
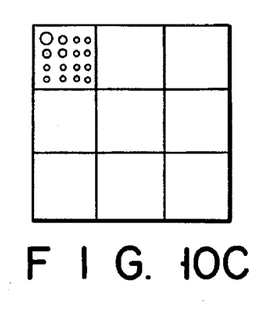
Figure 10D:
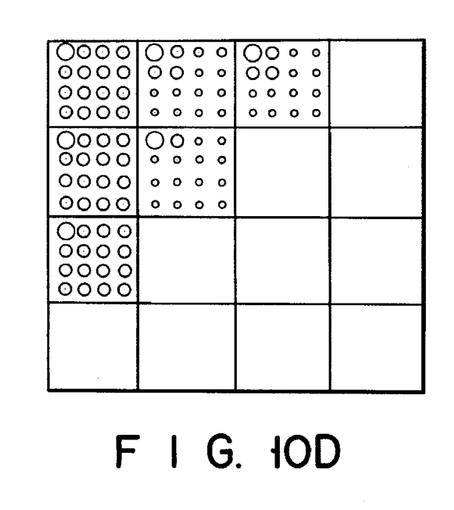
Figure 10E:
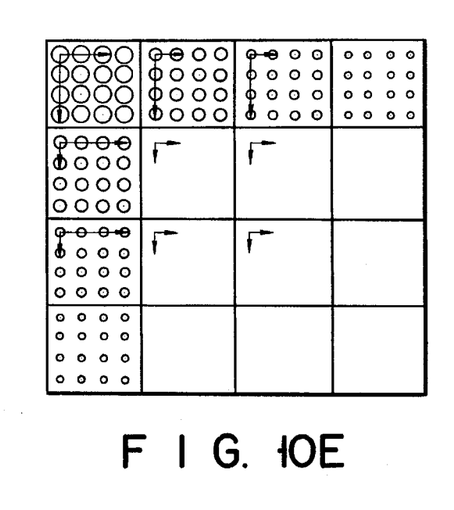

Each block is transformed into image data shown in FIG. 10C, by, e.g., two-dimensional fast cosine transform (step S3). Each orthogonal-transformed image data is stored in memory 39 in reconstruction circuit 38. The image data stored in memory 39 are rearranged so that identical frequency components are assembled into blocks, as shown in FIGS. 10D and 10E, in accordance with address data from address generator 38 (step S4). The rearrangement is called reconstruction, and identical frequency components of the blocks are collected into a single block. In FIGS. 10D and 10E, a difference in size of o represents that in frequency components.

Figure 10F:
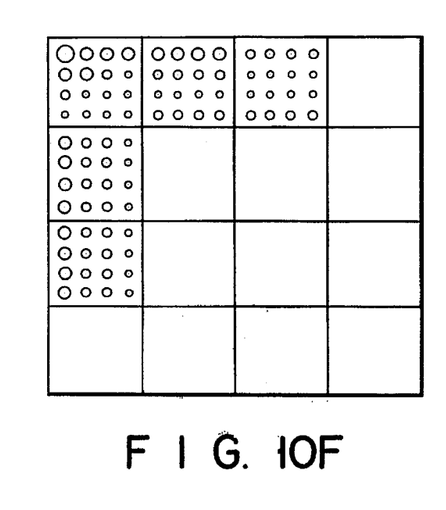

The reconstructed image data, i.e., image data stored in memory 39 are read out to second orthogonal transformer 40 in units of blocks. Transformer 40 implements two-dimensional or one-dimensional fast cosine transform of the image data of each block (step S5). The transformation output (FIG. 10F) from transformer 40 is input to quantization circuit 36, and is quantized in accordance with an allocation bit number stored in allocation table 35 (step S6). Upon this quantization, compressed image data can be obtained.

According to the embodiment described above, since the preprocessor for calculating the pseudo-ensemble mean and the pseudo-ensemble zero mean is provided at the input side of the image compression apparatus, the amplitude distribution of the identical frequency component cannot fall outside the center of the quantization band, and a quantization error can be eliminated.

Since image compression apparatus 30 has a function for reconstructing transformed outputs in units of identical frequency components after first orthogonal transformation, and again orthogonal-transforming the reconstructed outputs, energy of the image data is concentrated. As a result, a distortion due to quantization can be further eliminated. For this reason, when a compressed image is reproduced, the "block effect" caused by the quantization error can be eliminated, and an S/N ratio can be improved.

In the above embodiment, some reconstructed blocks require no second orthogonal transform. Such blocks do not pass through second orthogonal transformer 40, and are preferably input directly to quantization circuit 34. Thus, an image quality and a processing time can be further improved.

Figure 11:
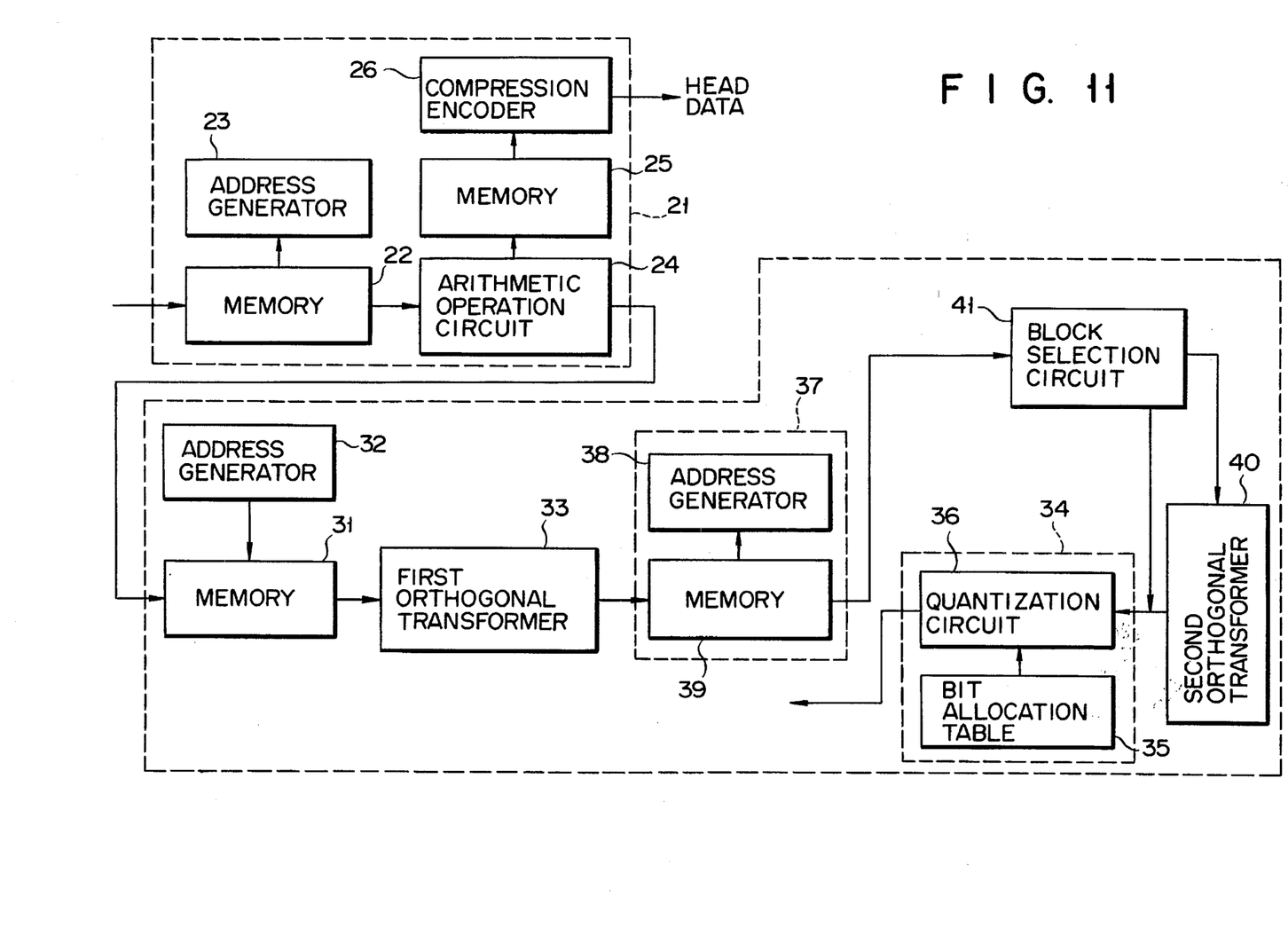
FIG. 11 is a circuit diagram of an image compression apparatus having a block selection function according to still another embodiment of the present inventions.

FIG. 11 shows a circuit for realizing the above-mentioned modification. With this circuit, block selection circuit 41 is arranged between reconstruction circuit 37 and second orthogonal transformer 40. Block selection circuit 41 classifies blocks into those requiring orthogonal transform and those requiring no more transform. The presence/absence of need for second orthogonal transform for each block will be described later.

Block selection circuit 41 transfers blocks which do not require orthogonal transform directly to quantization circuit 34. In this case, block selection circuit 41 discriminates from an address for designating a block whether or not a block requires orthogonal transform. Bit allocation table 35 is switched as needed.

In preprocessing according to another embodiment, mean values of pixels of the blocks are calculated, and are subtracted from pixels of the corresponding blocks. In this case, mean value Mean(ω) of the blocks is expressed by the following equation (11)

$$\text{Mean}(\omega) = 1/N \cdot \sum_{i=0}^{N-1} f(\vec{r}i, \omega) \quad (11)$$

where

N : number of pixels in block $\vec{r}i$ : spatial coordinate of ith pixel

ω: ωth block

A block zero mean can be calculated based on Mean(ω) obtained by equation (11) from the following equation (12):

$$f'(\vec{r}i, \omega) = f(\vec{r}, \omega) - \text{Mean}(\omega) \quad (12)$$

The block mean, i.e., $f'(\text{ri}, \omega)$ serves as a preprocessed output.

Figure 12:
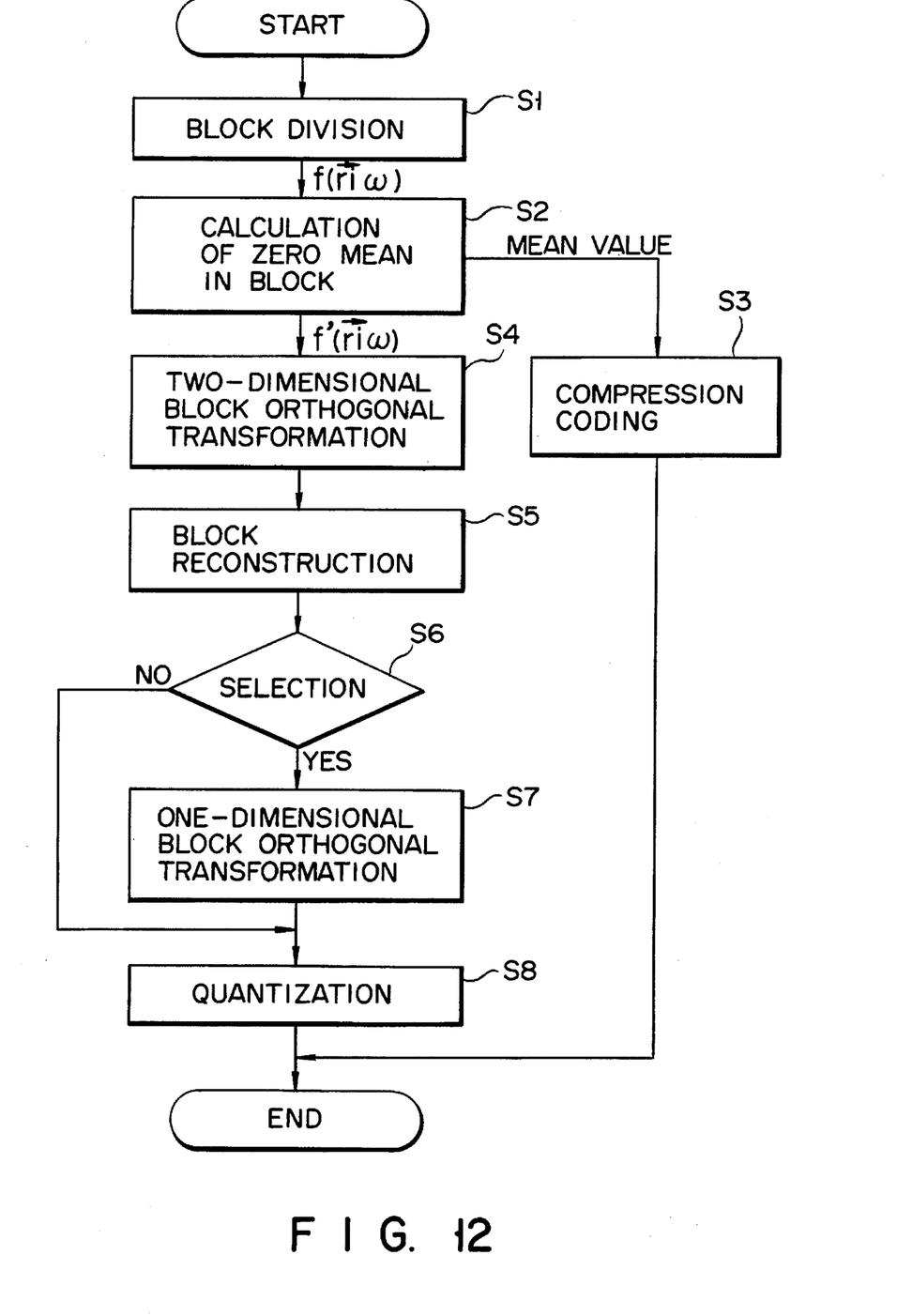
FIG. 12 is a flow chart for explaining the operation of the image compression apparatus according to still another embodiment, which performs preprocessing using a block mean and a block-zero mean.

Compression processing including the above preprocessing will be described with reference to the block diagram shown in FIG. 11 and the flow chart shown in FIG. 12.

An original image is divided into a plurality of blocks by the separation circuit constituted by memory 22 and address generator 23, and the blocks are input to arithmetic operation circuit 24. Arithmetic operation circuit 24 calculates a block zero mean based on equations (11) and (12). The block mean Mean is compressed and encoded by compression encoder 26 through memory 25. The coded data from compression encoder 26 is output as head data.

The block zero mean, i.e., the preprocessed output, obtained from arithmetic operation circuit 24 is stored in memory 32 of image compression apparatus 30. The image data stored in memory 31 and constituted by the preprocessed outputs, are read out from memory 31 as a plurality blocks upon addressing of address generator 32, and are input to first orthogonal transformer Transformer 33 orthogonal-transforms the image data in units of blocks, and supplies the transformed outputs to reconstruction circuit 37.

Figure 13:
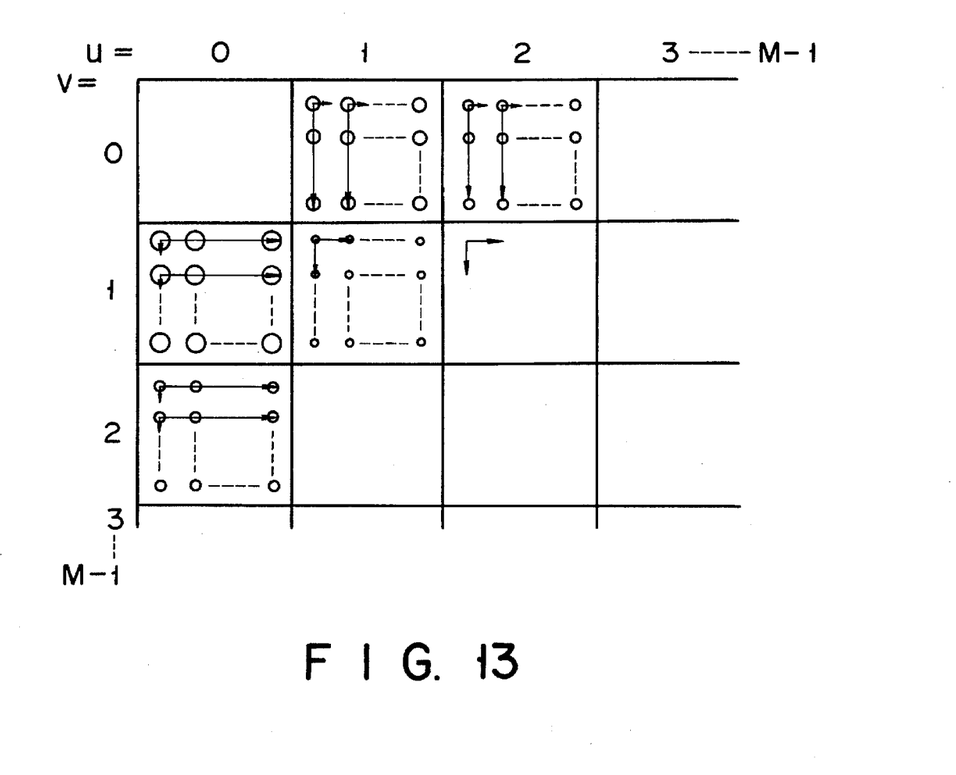
FIG. 13 is a view showing an orthogonal-transformed image block.

Reconstruction circuit 37 reconstructs the first transformed outputs in units of identical frequency components. The reconstructed outputs are shown in FIG. 13. In FIG. 13, a difference in frequency components is represented by a difference in size of o (circle). The reconstructed blocks are input to block selection circuit 41, and are classified into those requiring second orthogonal transform and those requiring no more transform. The blocks requiring the second orthogonal transform correspond to F(O,v) and F(u, O) in FIG. 13, and other blocks require no second orthogonal transform. The blocks requiring the second orthogonal transform are supplied to second orthogonal transformer 40 by block selection circuit 41, and other blocks are supplied to quantization circuit 34.

As can be seen from the theorem of Parseval, all DC components F(O,O) become zero. A quantization error can be eliminated for a DC component with a largest variance. Furthermore, for F(u,O) (u=1, 2, 3, . . . , M−1), correlation is high in the vertical direction and is low in the horizontal direction. For F(O,v) (v=1, 2,3, . . . , M−1), correlation is high in the horizontal direction, and almost no correlation is present for other frequency components. For this reason, blocks of F(O,v) and F( u,O) are subjected to one-dimensional orthogonal transform by second orthogonal transformer 40, and the same effect of the two-dimensional orthogonal transform can be obtained. Therefore, the blocks requiring the orthogonal transform are subjected to one-dimensional orthogonal transform by second orthogonal transformer 40. The blocks subjected to the one-dimensional orthogonal transform are input to quantization circuit 34.

Quantization circuit 34 quantizes the blocks input from block selection circuit 41 directly or through second orthogonal transformer 40, and outputs the quantized blocks to an external apparatus as compressed image data. In this case, the head data is also output to the external apparatus.

In the above-mentioned image compression processing, if original image data is directly input to image compression apparatus 30 without preprocessing, DC components orthogonal-transformed by first orthogonal transformer 33 have a large energy, and considerably high correlation is established between the DC components in each block. For this reason, when two-dimensional orthogonal transform is still performed for these DC components, a special bit allocation table for DC components must be prepared.

In this invention, since the preprocessing described above is performed for the original image data, DC components can be reduced to zero, and no orthogonal transform by second orthogonal transformer 40 is required for the DC components. In the above embodiment, since address generator 23 in preprocessor 21 and address generator 32 in compression apparatus 30 have quite the same function, a single address generator can be commonly used for preprocessor 21 and apparatus 30. Similarly, memories 2, 5, 11, and 19 can be replaced with a single memory. Since two-dimensional orthogonal transform can include one-dimensional orthogonal transform, first and second orthogonal transformers 33 and 40 can be replaced with a single orthogonal transformer (two-dimensional orthogonal transformer).

Figure 14:
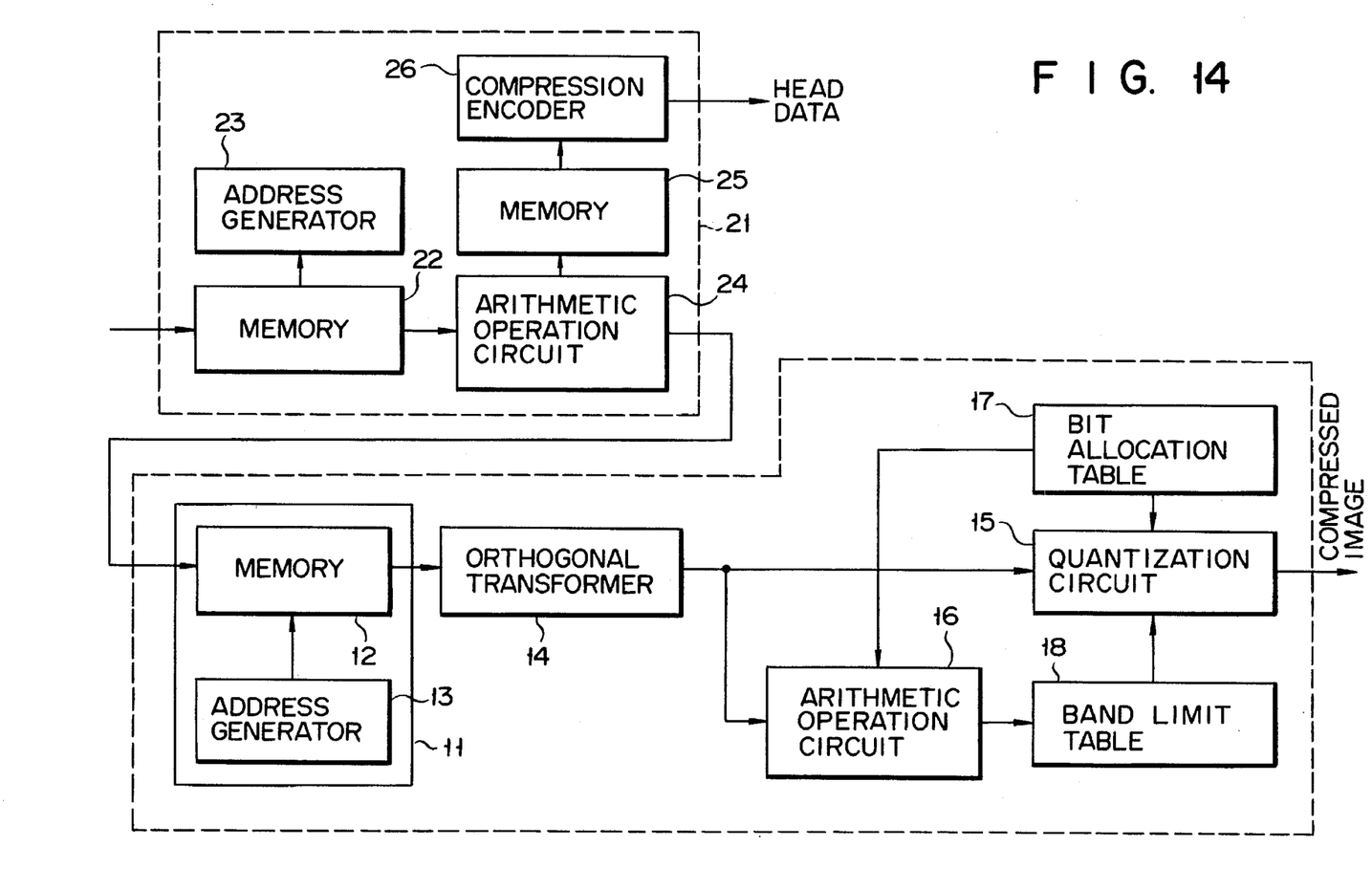
FIG. 14 is a block diagram of an image compression apparatus having a preprocessing function and a nonlinear limit band according to still another embodiment of the present invention.

According to an embodiment shown in FIG. 14, a quantization circuit section including quantization circuit 15, bit allocation table 17, and band limit table 18 is arranged so as to obtain the effect of the band limit table in addition to the effect of preprocessing. Thus, a quantization error can be eliminated and an S/N ratio can be improved in image compression.

What is claimed is:

1. An image compression apparatus comprising:

means for dividing an original image data into a plurality of image data blocks each of which is constituted by a plurality of pixels;

preprocessing means for calculating a mean value of pixels of each of the plurality of image data blocks obtained by said dividing means, and for subtracting the mean value of pixels of each block for the pixels located at corresponding block, to output a plurality of preprocessed outputs each corresponding to a difference between the mean value and each of the pixels; and compression circuit means for orthoqonally-transforming, for each block, the preprocessed outputs obtained from said preprocessing means and outputting a plurality of transformed outputs corresponding to the image data blocks and for quantizing each of the transformed outputs to compress the image data, said compression circuit means including a first table for storing bit-number data representing the number of bits allocated in accordance with the frequency component of each of the orthoqonally-transformed image data blocks obtained by said orthoqonally-transforming means, a second table for storing data for limiting a quantization band to decrease a quantization band width as the number of bits allocated to the image data by said first table is reduced, and quantization means for quantizing the image data blocks in accordance with the data stored in said first and second tables.

2. An apparatus according to claim 1, wherein said compression circuit means comprises division means for dividing the preprocessed outputs obtained from said preprocessing means into a plurality of image data blocks, first orthogonal transform means for orthogonal-transforming the data blocks obtained by said division means in units of blocks and generating the transformed outputs, means for reconstructing the transformed outputs obtained by said first orthogonal transform means in units of identical frequency components and generating reconstructed outputs, second orthogonal transform means for orthogonally-transforming the reconstructed outputs obtained by said reconstructing means and generating second orthogonally-transformed outputs, and quantization means for quantizing the second orthogonally-transformed outputs obtained by said second orthogonal transform means.

3. An apparatus according to claim 2, wherein said division means comprises memory means for storing image data, and means for addressing said memory means in order to read out the preprocessed outputs in units of blocks.

4. An apparatus according to claim 2, wherein said reconstructing means comprises memory means for storing the transformed outputs from said first orthogonal transform means, and addressing means for outputting address data to said memory means so as to read out the transformed outputs in units of identical frequency components from said memory means.

5. An apparatus according to claim 2, wherein said second orthogonal transform means comprises orthogonal transform means for implementing one-dimensional orthogonal transform of the reconstructed outputs from said reconstructing means.

6. An apparatus according to claim 2, further comprising selection means for discriminating the reconstructed outputs from said reconstructing means to be components requiring orthogonal transform and components requiring no orthogonal transform, and selectively supplying the reconstruction outputs to said second orthogonal transform means and said quantization means in accordance with the discrimination result.

7. An image compression apparatus comprising:

means for dividing an original image data into a plurality of image data blocks, each of which is constituted by a plurality of pixels;

preprocessing means for calculating a set of pixel mean values, each being a mean value of pixels which are located at identical coordinates within two-dimensional spatial coordinate domains, and the plurality of image data blocks obtained by said dividing means, and for subtracting the mean value of pixels of each block from the pixels located at a corresponding block to output preprocessed outputs each corresponding to a difference between each of the pixels and the means value; and compression circuit means for orthoqonally-transforming for each block, the preprocessed outputs obtained from said preprocessing means to output a plurality of transformed outputs corresponding to the image data blocks and for quantizing each of the transformed outputs to compress the image data, said compression circuit means including a first table for storing bit-number data representing the number of bits allocated in accordance with a frequency component of each of the orthoqonally-transformed image data blocks obtained by said compression circuit means, a second table for storing data for limiting a quantization band to decrease a quantization band width as the number of bits allocated to the image data by said first table is reduced, and quantization means for quantizing the image data blocks in accordance with the data stored in said first and second tables.

8. An apparatus according to claim 7, wherein said compression circuit means comprises division means for dividing the preprocessed outputs obtained from said preprocessing means into a plurality of data blocks, first orthogonal transform means for orthogonally-transforming the data blocks obtained by said division means in units of blocks and generating the transformed outputs, means for reconstructing the transformed outputs obtained by said first orthogonal transform means in units of identical frequency components and generating reconstructed outputs, second orthogonal transform means for orthogonally-transforming the reconstructing outputs obtained by said reconstruction means and generating second orthogonally-transformed outputs, and quantization means for quantizing the second orthogonally-transformed outputs obtained by said second orthogonal transform means.

9. An apparatus according to claim 8, wherein said division means comprises memory means for storing image data, and means for addressing said memory means in order to read out the preprocessed outputs in units of blocks.

10. An apparatus according to claim 8, wherein said reconstructing means comprises memory means for storing the transformed outputs from said first orthogonal transform means, and addressing means for outputting address data to said memory means so as to read out the transformed outputs in units of identical frequency components from said memory means.

11. An apparatus according to claim 8, wherein said second orthogonal transform means comprises orthogonal transform means for implementing one-dimensional orthogonal transform of the reconstructed outputs from said reconstructing means.

12. An apparatus according to claim 8, further comprising selection means for discriminating the reconstructed outputs from said reconstructing means to be components requiring orthogonal transform and components requiring no orthogonal transform, and selectively supplying the reconstruction outputs to said second orthogonal transform means and said quantization means in accordance with the discrimination result.

13. An image compression apparatus comprising:

means for dividing an original image data into a plurality of image data blocks, each of which is constituted by a plurality of pixels;

orthogonal transformation means for orthogonally-transforming the image data blocks output from said dividing means and outputting a plurality of frequency components including a plurality of identical frequency components and corresponding to the pixels;

a first table for storing bit-number data representing the number of bits allocated in accordance with the frequency component of each of the orthogonally-transformed image data blocks obtained by said orthogonal transformation means;

a second table for storing data for limiting a quantization band to decrease a quantization band width as the number of bits allocated to the image data by said first table is reduced; and quantization means for quantizing the image data blocks in accordance with the data stored in said first and second tables.

* * * * *

UNITED STATES PATENT AND TRADEMARK OFFICE
CERTIFICATE OF CORRECTION

PATENT NO. : 5,506,916
DATED : April 09, 1996
INVENTOR(S) : Eitaro NISHIHARA et al.

It is certified that error appears in the above-indentified patent and that said Letters Patent is hereby corrected as shown below:

Claim 1, column 8, line 60, " orthoqonally-transformed " should read -- orthogonally-transformed --.

Claim 1, column 8, lines 51, and 61, " orthoqonally-transforming " should read -- orthogonally-transforming --.

Claim 2, column 9, line 5, "orthogonal-transforming" should read --orthogonally-transforming--.

Claim 7, column 9, line 53 and lines 61-62, "orthoqonally-transforming" should read --orthogonally-transforming--.

Signed and Sealed this

Sixth Day of May, 1997

*Attest:*

BRUCE LEHMAN

*Attesting Officer*     Commissioner of Patents and Trademarks